Figure 1:
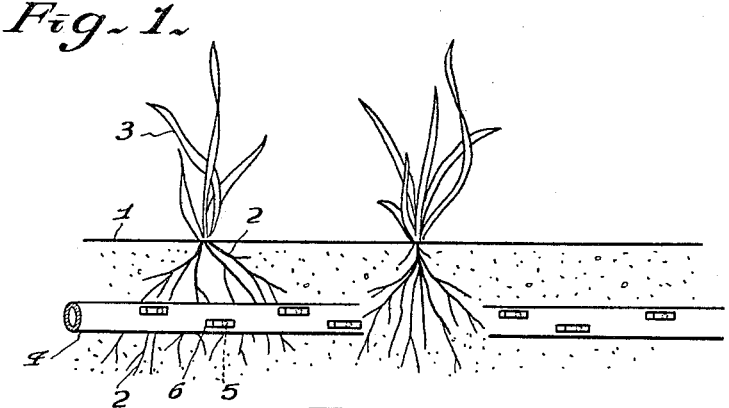

Dec. 18, 1962 KATSUSUKE SHIBATA ET AL 3,068,616
PLANT CULTIVATION APPARATUS
Filed April 15, 1960 3 Sheets-Sheet 1

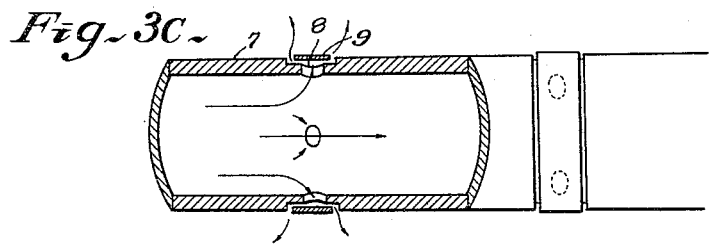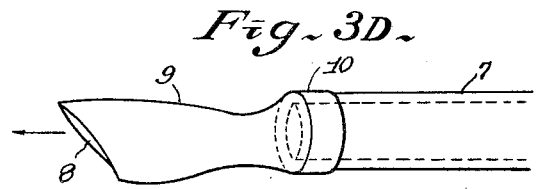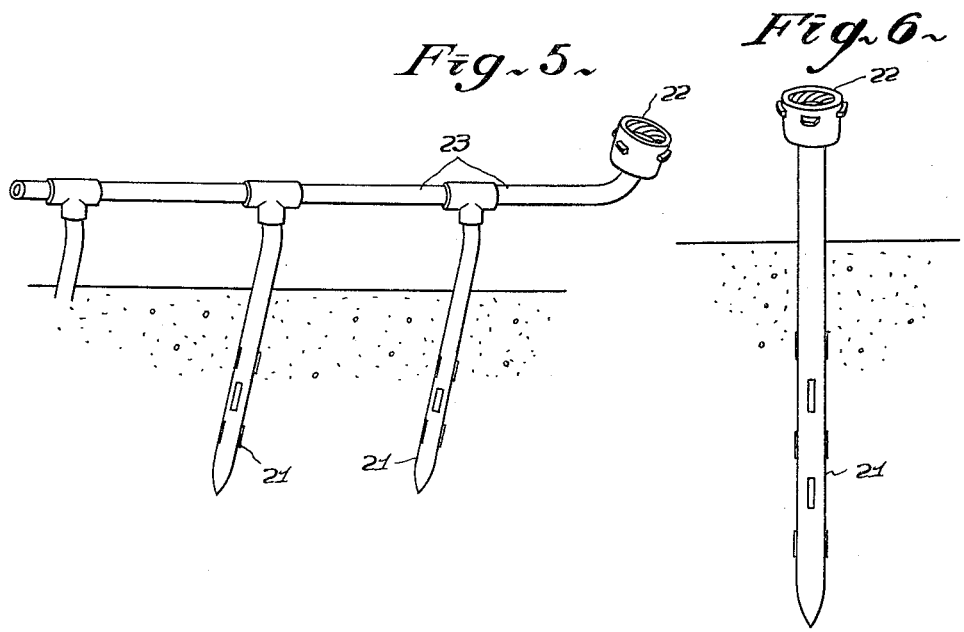

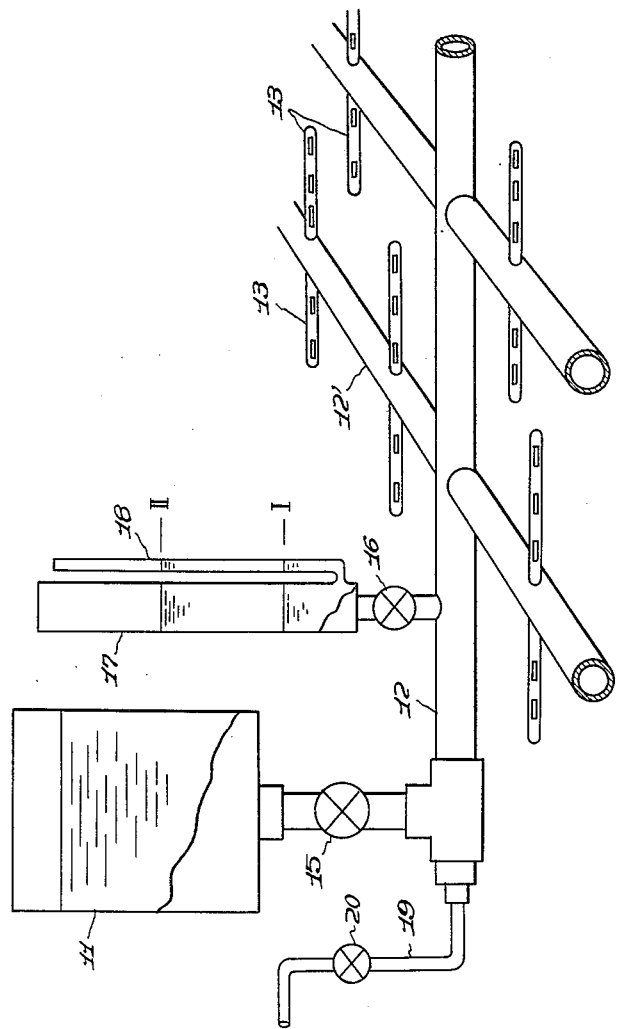

United States Patent Office 3,068,616
Patented Dec. 18, 1962

3,068,616
PLANT CULTIVATION APPARATUS
Katsusuke Shibata, Yokohama-shi, Kanagawa-ken, and Takeyasu Mori, Tokyo-to, Japan, assignors of one-third to George Tomoo Shibata, St. Louis, Mo.
Filed Apr. 15, 1960, Ser. No. 22,610
Claims priority, application Japan June 15, 1959
1 Claim. (Cl. 47—1)

This invention relates to the agronomical cultivation of plants, and more particularly it relates to a new and practical method of supplying water, air, chemicals and other substances to plants for their healthful growth.

It is an object of this invention to provide a new and practical method of plant cultivation wherein water, air, chemicals and/or other substances are supplied easily and economically to plants for their healthful growth.

It is another object of this invention to provide a method whereby the supply and distribution of water, air, chemicals or other substances can be accomplished with complete and intentional control over such results as quantity and distribution of fluids supplied and time and space of supply, said control being exercised in accordance with the existing conditions so as to obtain overall optimum results.

Said objects and other objects and advantages as will become apparent hereinafter, have been achieved by the method and apparatus of the present invention as disclosed in the claim.

By the method of the present invention, pipes are embedded in the soil and from these pipes not only water, but air also, is discharged in a forceful manner. Consequently, the efficiency air turn-over by this method is almost incomparably higher than that when the aeration is left up to natural ventilation. That a gaseous substance sent into porous layers such as soil moves and diffuses, because of physical properties, uniformly through the structure of said layers can be observed experimentally. Of course, the velocity of said gas varies with the porosity of the soil, but the gas spreads gently in an almost perfectly uniform, spherical form, and only a very small quantity of air actually supplied into the soil is sufficient. The surplus water content within the soil is drained off through the passages maintained by the supplied air or is vaporized and transported away by air passing through, and it is possible to maintain the soil moisture content constantly at the optimum condition. This method is very effective, even when the soil is extremely wet. Disadvantages due to the excess water in the soil are caused by lack of fresh air. However wet the soil is, the plants grow well if only sufficient air is supplied and some plants, for instance paddy or rice, increase in their products by this method.

One of the reasons why this method, which has so many advantages, has not been used heretofore is that the maintenance of the pipes in a clean state has been difficult. If a pipe merely with holes is buried in the soil, earth and sand will enter the pipe through these holes, and as the roots or fungi in the soil grow towards water they attack into the pipe through these holes. Pipes have been used heretofore, the holes of which are covered with fibrous filter, but roots or fungi propagate in the filter and cause serious harm.

However, by the method of the present invention, since the pipes are constructed to have holes covered by valve-like devices, said holes opening only when the fluid supplied is discharged and closing when the discharge stops, earth and sand cannot enter the pipes. Furthermore, since the valves have a certain surface area, the external pressure is imparted on said valves as an average, and the pressure of the valve against the discharge holes is substantially more uniform than in the case wherein only holes or filtered holes are provided.

Figure 2:
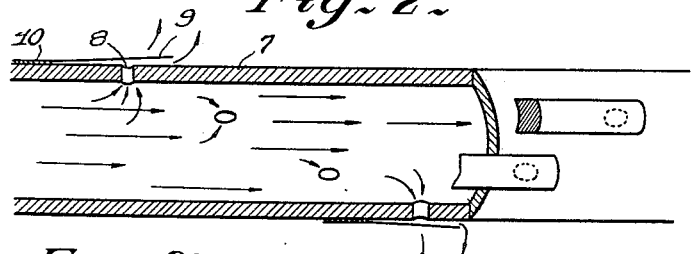
Figure 3A:
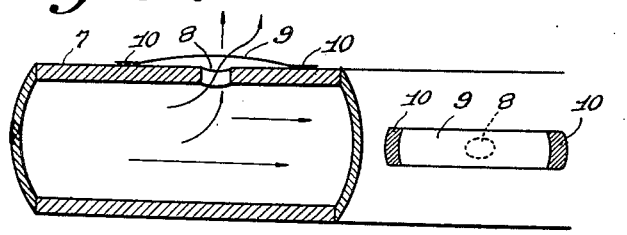
Figure 3B:
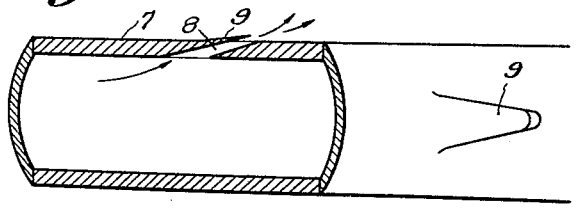

The details of the invention will be more clearly apparent by reference to the following detailed description of a few representative embodiments of the invention when taken in connection with the accompanying illustrations, in which:

FIG. 1 is an elevational view, partly in section, showing one representative embodiment of the underground part of the invention, FIG. 2 is a partial view, partly in longitudinal section, of a pipe to be used for the practice of the method of this invention, showing one form of valve mechanism, FIGS. 3A, 3B and 3C are partial views similar to FIG. 2, showing modifications of the valve mechanism, FIG. 3D is a side elevational view of an end of a pipe such as those illustrated in FIGS. 2 and 3A, 3B and 3C, showing one form of pipe-end valve, FIG. 4 is a schematic diagram, with parts in perspective and parts in elevation and with parts cut away, showing the essential devices and parts of one embodiment of the apparatus suitable for use in accordance with this invention, FIG. 5 comprises a side view in elevation, showing a modified embodiment of the apparatus, and FIG. 6 is an end view of the FIG. 5 structure.

The special feature of the method of this invention is that fluid is supplied to the roots of each plant through a pipe which has been properly laid in the ground and through valves fitted in the pipe which control the flow of fluid supplied. The valve can be made, for example, of thin elastic materials covering the hole from the outside of the pipe. When one end of the pipe is closed and fluid is forced into the pipe from the other end under controlled pressure, the valve will open and the fluid will be released and distributed to the plants. Also at the end of the pipe-line a flat, sheath-shaped valve made of an elastic, flexible material could be fitted which would cut off outside pressure and permit flow from within.

Referring to FIG. 1, reference numeral 1 designates the surface of the soil which contains the roots 2 of a plant being cultivated, whose parts above the surface are designated by numeral 3. A pipe 4 for supplying the fluids as described previously is installed in the soil parallel, for the most part, to the surface 1. Said pipe 4 is provided with holes 5 of suitable dimensions and spacing through which the said fluids are distributed, and the holes 5 are respectively provided with valve mechanisms 6 which are opened by the pressure of the fluid within the pipe 4 and permit said fluid to flow out into the soil but are closed by any back pressure from the soil and prevent the infiltration, due to said back pressure, of particles of sand and earth into the pipe 4.

Referring to FIGS. 2, 3A, 3B and 3D in which like parts are designated by the same reference numerals, and in which various alternate modifications of the pipe outlet hole and valve mechanism are illustrated in detail, numeral 7 designates the pipe or tube wall which is provided with outlet holes 8 provided with valves 9. Each of said valves 9 is fixed to the pipe wall at part 10.

FIG. 3A shows a valve which is attached at both ends to the pipe. FIG. 3B shows an example of a tongue-shaped valve which takes advantage of elasticity of the pipe material. FIG. 3C shows an example of a valve which is made of an elastic strip of material encircling the pipe and covering the outlet hole. In all of these examples, the valves function similarly to the valve shown in FIG. 2. FIG. 3D shows an example of a flat, sheath-shaped valve made of flexible material which can be fitted to the end of the pipe line. This valve is also constructed to prevent flow from the outside into the pipe but readily permit flow from within the pipe out into the soil.

If the functioning of the valve is similar to any of those pictured in the drawings, that is, if the valve, which is made of thin, flexible and elastic synthetic resin, fits the outside wall of the pipe perfectly, shuts the opening and prevents external fluid, dirt and sand from flowing into the pipe, the valve may be of any shape. The valve not only controls the outflow of fluid from the pipe but it also prevents almost completely the inflow of external fluids, dirt and sand into the pipe.

The drawings show the pipe with valves laid in the ground horizontally, but the pipes can also be thrust into the soil from above or laid at any angle. The suitable method for the crop and for the ground conditions should be judged by individual or particular conditions or situations, and selection thereof made accordingly.

FIG. 4 is a drawing of an example where a network of pipe lines, a system of pipes, is used. A water tank 11 which is filled with water and a compressed air tank 19 are connected to a main pipe line 12, which has branch lines 12' attached to it. Each branch line 12' is further connected to pipes 13 fitted with valves. Between the tank 11 and the main pipe 12 is placed a shut-off valve 15, and between the compressed air tank 19 and the main pipe 12 is placed a shut-off valve 20. Also on the main pipe-line near the tank 11 is an open-ended cylindrical tank 17 with an attached water level gauge 18 and shut-off valve 16.

In FIGURE 4, the soil and plants are omitted and the relation of the pipe network to the ground is not shown, but at least the pipes fitted with valves 13 are to be underground. The main pipe-line 12 and the branch lines 12' can be exposed to the air.

Next, referring to FIG. 2, let it be supposed that the pipe 7 initially has only air in it and no water. The proper functioning of the valve 9 will prevent dirt and fluid from entering the pipes. Then when water is run into the pipes, the air in the pipes is forced out through the valves and the pipes are filled with water. Some water may go through the valves but water, unlike gaseous air, has a higher viscosity and a heavier specific gravity so that almost no water will leak out of the pipe until it is completely filled. After the pipe has been filled with water and pressure is added to the water, the water will push the valves open and escape into the soil. Thus in a very simple manner water can be sent to the extremities of the pipe network, and an equal volume of water can be distributed through each valve at the same time.

Referring again to FIG. 4, first cock 20 is closed and cock 16 is opened; then when cock 15 is opened gradually, the water in the tank 11 fills the main pipeline, the branches and attached pipes; this is indicated by the rising of water in the cylindrical tank 17. Suppose that cock 15 is closed after the water has risen to the line I shown in the drawing. If the water pressure is lower than the sum of the pressure of the soil and the valves, as mentioned above, water will not be ejected from the valves. Now if cock 15 is opened again and the height of the water in the cylindrical tank rises from the Marker I to Marker II, then the valves will be pushed open and water will be distributed in the soil at all points simultaneously in any amount, so that when fertilizers and chemicals are dissolved in the water they also can be distributed uniformly without any loss. The water in tank 11 can be supplied by a pump.

Again suppose that cocks 15 and 16 are closed and the compressed air in the tank 19, which is supplied with compressed air from an air compressing pump, is connected to the main pipe 12 by opening the cock 20, high pressure air will force the remaining water out of pipes and at the same time escape into the soil and aerate it.

If sufficient pressure is used explosively, the soil itself can be moved and agitated. This is performed effectively and the layer of soil is crushed and loosened as well as when it is ploughed. For this purpose a compressed air tank is used. Thus this method of the invention can be a cultivating method also.

The pipe fitted with valves may be individual systems merely thrust into the soil and to which a more convenient or portable source of water and compressed air can be attached. This particular example of pipes is illustrated in FIGS. 5 and 6. The pipe 21 fitted with valves is thrust from the surface into the soil vertically or at any angle. A pipe connection is fitted to the open end of the pipe above the surface. To each pipe connection 22 there could be a single valve fitted pipe 21 or a number of pipes. When a number of pipes, or a system of pipes, is used, connecting pipes 23 should be used to space the pipe 21 fitted with valves in convenient locations. This system is convenient for setting up and removal because the pipes fitted with valves can be placed and used by merely thrusting them into the soil. The pipe connections can be connected to exposed main pipelines or movable and portable water tanks and sources of compressed air, and used as needed.

If synthetic resin, research on which has made great progress recently, is used for the pipelines, for the pipe fitted with valves and for the elastic valves themselves, the length of time of their efficient use can be extended and the cost of installation will soon be repaid by the increase of yields.

Since it is obvious that many changes and modifications can be made in the above described details without departing from the nature and spirit of the invention, it is to be understood that the invention is not to be limited to the details described herein except as set forth in the appended claim.

We therefore claim:

An apparatus adapted to selectively provide air, water or chemicals to soil to be cultivated, said apparatus comprising a pipe system composed of main pipes, branch pipes and distribution pipes, said pipes being provided with spaced distribution holes, said holes being provided with valves of the check-valve type, permitting outflow of the fluid from within the pipe when the pipe internal pressure exceeds the external pressure of the soil, but preventing infiltration of dirt and sand from the soil into the pipe interior when the said external pressure exceeds the said pipe internal pressure, said valves being made of thin, flexible and elastic synthetic resin, a supply of compressed air and of water under pressure which is connected to said pipe system to selectively supply compressed air and water to said pipe system, stop valves for control of said air and water to said pipe system, and pump and liquid level gauges combined with said pipe system so that compressed air or water may be selectively supplied to the underground portions of plants to be cultivated.

References Cited in the file of this patent

UNITED STATES PATENTS

| | | |
|---|---|---|
| 953,080 | Wiggins | Mar. 29, 1910 |
| 1,247,166 | Steelquist | Nov. 20, 1917 |
| 2,052,020 | Black | Aug. 25, 1936 |
| 2,536,196 | MacLeod | Jan. 2, 1951 |
| 2,798,768 | Babin | July 9, 1957 |

FOREIGN PATENTS

| | | |
|---|---|---|
| 71,457 | Norway | Aug. 18, 1947 |